United States Patent
Despland et al.

(10) Patent No.: US 8,696,031 B2
(45) Date of Patent: Apr. 15, 2014

(54) ORIENTED IMAGE COATING ON TRANSPARENT SUBSTRATE

(75) Inventors: Claude-Alain Despland, Prilly (CH); Mathieu Schmid, Lausanne (CH); Pierre Degott, Crissier (CH); Edgar Müller, Fribourg (CH); Albert Stichelberger, Leonding (AT)

(73) Assignee: SICPA Holding SA, Prilly (CH)

( * ) Notice: Subject to any disclaimer, the term of this patent is extended or adjusted under 35 U.S.C. 154(b) by 176 days.

(21) Appl. No.: 12/304,546

(22) PCT Filed: Jul. 6, 2007

(86) PCT No.: PCT/EP2007/056863
§ 371 (c)(1), (2), (4) Date: Jan. 7, 2009

(87) PCT Pub. No.: WO2008/009569
PCT Pub. Date: Jan. 24, 2008

(65) Prior Publication Data
US 2009/0200791 A1 Aug. 13, 2009

(30) Foreign Application Priority Data
Jul. 19, 2006 (EP) .................. 06117451

(51) Int. Cl.
*B42D 15/00* (2006.01)

(52) U.S. Cl.
USPC ........... 283/72; 359/626; 428/195.1; 428/323

(58) Field of Classification Search
USPC ................... 283/72, 82, 86, 107, 109
See application file for complete search history.

(56) References Cited

U.S. PATENT DOCUMENTS

| | | | |
|---|---|---|---|
| 2,418,479 A | 4/1947 | Pratt et al. | |
| 2,570,856 A | 10/1951 | Pratt et al. | |
| 3,676,273 A | 7/1972 | Graves | |
| 3,791,864 A | 2/1974 | Steingroever | |
| 4,186,944 A | 2/1980 | Pearce | |
| 4,705,300 A * | 11/1987 | Berning et al. ............... | 283/91 |
| 4,705,356 A | 11/1987 | Berning et al. | |

(Continued)

FOREIGN PATENT DOCUMENTS

| | | | |
|---|---|---|---|
| DE | EP2005055884 | * 11/2005 | ............. B42D 15/10 |
| EP | 0227423 | 6/1992 | |

(Continued)

OTHER PUBLICATIONS

English-language translation of Japanese Office Action issued with respect to Japanese family member patent application.

(Continued)

*Primary Examiner* — Joseph Rocca
*Assistant Examiner* — Shin Kim
(74) *Attorney, Agent, or Firm* — Greenblum & Bernstein, P.L.C.

(57) ABSTRACT

The present invention discloses a security element comprising a transparent substrate and a magnetically oriented image coating on said substrate, wherein said image coating is preferably laid out such as to show a 3-dimensional effect, appearing in positive or negative relief respectively, if observed form the recto- or the verso side, respectively. The security element can be easily identified by the unaided eye, by just turning around the document and observing the angle-dependent image on either side. On the other hand, the security element cannot be reproduced by scanning or copying the document.

23 Claims, 3 Drawing Sheets a) view from recto b) view from verso

(56) References Cited

U.S. PATENT DOCUMENTS

| | | | |
|---|---|---|---|
| 4,721,271 A | 1/1988 | Goldstein et al. | |
| 4,838,648 A | 6/1989 | Phillips et al. | |
| 5,364,689 A | 11/1994 | Kashiwagi et al. | |
| 5,437,897 A | 8/1995 | Tanaka et al. | |
| 5,806,895 A * | 9/1998 | Sharabani | 283/61 |
| 6,103,361 A | 8/2000 | Batzar et al. | |
| D436,620 S * | 1/2001 | Webb et al. | D19/10 |
| 6,616,190 B1 * | 9/2003 | Jotcham | 503/200 |
| 6,838,166 B2 | 1/2005 | Phillips et al. | |
| 6,875,522 B2 | 4/2005 | Seto et al. | |
| 6,902,807 B1 * | 6/2005 | Argoitia et al. | 428/403 |
| 6,953,206 B1 | 10/2005 | Dilz et al. | |
| 7,047,883 B2 | 5/2006 | Raksha et al. | |
| 7,300,695 B2 * | 11/2007 | Argoitia et al. | 428/206 |
| 7,333,268 B2 * | 2/2008 | Steenblik et al. | 359/619 |
| 7,654,580 B2 * | 2/2010 | Alasia et al. | 283/74 |
| 2002/0160194 A1 | 10/2002 | Phillips | |
| 2004/0009309 A1 | 1/2004 | Raksha et al. | |
| 2004/0051297 A1 | 3/2004 | Raksha et al. | |
| 2005/0106367 A1 | 5/2005 | Raksha et al. | |
| 2005/0180020 A1 | 8/2005 | Steenblik et al. | |
| 2005/0277710 A1 | 12/2005 | Joyce et al. | |
| 2006/0194040 A1 | 8/2006 | Raksha et al. | |
| 2008/0035736 A1 * | 2/2008 | Tompkin et al. | 235/488 |
| 2009/0230670 A1 * | 9/2009 | Schmid et al. | 283/85 |

FOREIGN PATENT DOCUMENTS

| | | | |
|---|---|---|---|
| EP | 688675 | 5/2002 | |
| EP | 05/009920 * | 9/2004 | G09D 7/00 |
| EP | 1042130 | 3/2006 | |
| EP | 1650042 | 4/2006 | |
| EP | 1854852 | 11/2007 | |
| JP | 5-339900 | 12/1993 | |
| JP | 6-86958 | 3/1994 | |
| JP | 2001-315472 | 11/2001 | |
| JP | 2002-539478 | 11/2002 | |
| JP | 2004-518565 | 6/2004 | |
| JP | 2005-532941 | 11/2005 | |
| TW | 200617083 A | 6/2006 | |
| WO | 02/09002 | 1/2002 | |
| WO | 02/073250 | 9/2002 | |
| WO | 02/073520 | 9/2002 | |
| WO | 03/000801 | 1/2003 | |
| WO | 2004/007095 | 1/2004 | |
| WO | 2005/002866 | 1/2005 | |
| WO | 2005/058608 | 6/2005 | |
| WO | 2006/029857 A2 | 3/2006 | |
| WO | 2006/061301 A1 | 6/2006 | |

OTHER PUBLICATIONS

Japanese Office Action issued with respect to patent family member Japanese Patent App. No. 2009-519915, mailed Jan. 15, 2013.

English language translation of Taiwanese Office Action issued with respect to patent family member TW Patent App. 096125771, mailed Jul. 22, 2013.

* cited by examiner a) view from recto b) view from verso a) scanned view recto b) scanned view verso a) recto view b) verso view

ORIENTED IMAGE COATING ON TRANSPARENT SUBSTRATE

FIELD OF THE INVENTION

The present invention relates to a security element for value and ID documents. More specifically it relates to an angle-dependent image on a transparent substrate, preferably showing a 3-dimensional effect, in positive or negative relief, if observed from the recto- or verso side, respectively.

BACKGROUND OF THE INVENTION

Optically variable devices of various types are used as efficient anti-copying means on security- and value-documents. Among these, particularly important optically variable copy-protection means are the optically variable inks (OVI®; EP-A-0227423). Optically variable inks (OVI®) are used to print surfaces and/or indicia which exhibit a viewing angle dependent color (=color shift).

Said anti-copying inks comprise optically variable pigments (OVP™); preferred types being the flake shaped thin-film optical interference pigments described in U.S. Pat. No. 4,705,300; U.S. Pat. No. 4,705,356; U.S. Pat. No. 4,721,271 and thereto related disclosures.

Magnetic optically variable pigments in printing inks or coatings allow for the production of magnetically induced images, designs and/or patterns through the application of a corresponding magnetic field, causing an orientation of the magnetic optically variable pigment in the coating, followed by drying/curing the latter. The result is a fixed magnetically induced image, design or pattern in an optically variable ink. Depending on their layout, said images, patterns or designs are perceived as having a three dimensional or relief-like appearance, although the printing itself remains geometrically flat.

The magnetic optically variable printing inks disclosed in the co-pending European patent application EP06113891.3 of the same applicant, the respective content of which is herein included by reference, are particularly adapted for the production of magnetically induced images.

Materials and technology for the orientation of magnetic particles in coating compositions, and corresponding printing processes have been disclosed in U.S. Pat. No. 2,418,479; U.S. Pat. No. 2,570,856; U.S. Pat. No. 3,791,864; U.S. Pat. No. 3,676,273; U.S. Pat. No. 5,364,689; Us 6,103,361; US 2004/0051297; US 2004/0009309; US 2002/0160194; WO 02/09002; US 2005/0106367; WO 04/007095; WO 2005/058608 and WO 2005/002866, the respective contents of these documents are incorporated herein by reference.

The documents of the prior art provide thus various methods and apparatuses for producing a magnetic image coating on a substrate. In all cases, said magnetic image coating is provided in such a way that it can be viewed only from a single side of the substrate, noteworthy from the printed side. No recto-verso use of a magnetically oriented coating has been disclosed.

DESCRIPTION OF THE INVENTION

It was the problem of the present invention to provide a security element which allows an easy authentication of an article such as a banknote and which can be performed by the man on the street with the unaided eye.

According to the present invention, this problem is solved by a security element as defined in claim 1. More specifically, the present invention is related to a security element comprising a transparent substrate and a magnetically oriented image coating on said substrate.

It was surprisingly discovered that an optically variable security element comprising a transparent substrate, which allows to observe a coating disposed thereupon from the recto and the verso side, said coating carrying a design with a special visual appearance, preferably a 3D appearance, produced through the orientation of pigment flakes, e.g. by applied magnetic fields, is an extremely valuable security element for the rapid visual (overt) authentication of documents, in particular of transparent items or items comprising transparent regions. In fact, the especially preferred magnetically produced, apparent 3D-relief inverts upon a change of the side of observation; it is therefore sufficient to turn the document around and to observe the inversion of the magnetically induced image, in order to rapidly authenticate the document.

Magnetic orientation of an image coating results in a visual effect which can change depending upon the viewing angle under which said image coating is observed. This effect is preferably a 3-dimensional effect which is reverted when said image is viewed from the upper or lower side (recto or verso side). However, also other visual effects are possible, such as switching optical effects or rolling bar-type images.

For example, if the design is perceived as a round curvature, a line or spot of maximum reflection appears on the design; said line or spot moves with the angle of observation either in the same sense (convex appearance), or in the opposite sense, (concave appearance), depending on the side of observation.

The security element of the present invention is thus an angle-dependent image on a transparent substrate, preferably laid out such as to show a 3-dimensional effect, appearing in positive or negative relief respectively when observed from the recto- or verso side, respectively, such as illustrated by FIG. 1 which is explained in more detail below. The 3-dimensional image appears to come out of the plane or to go into the plane, depending on the side of observation.

Examples of suitable 3D-designs are a cylinder, a hemisphere, a pyramid, a cone, a roof, etc. Several geometric forms may further be combined. Their simple appearance can be easily recognized as emerging from or diving into the plane of the image. More sophisticated designs such as numbers, characters, figures or logos may be produced as well. The security element of the present invention is preferably combined with color-shifting elements, such as the "switching optical effect" and "rolling bar-type images" disclosed in WO 04/007095.

The security element of the present invention can be easily identified by the unaided eye, just by turning around the document or item, and observing the angle-dependent image on either side. It is therefore very suited for use by the man in the street, who is provided with a simple means to check the authenticity of e.g. a banknote.

The security element of the present invention can further be over-laminated with a transparent foil, in order to increase the resistance and life-time of the security element.

The transparent substrate can be of any plastic or polymer material which is transparent in at least part of the visible spectrum (i.e. in the wavelength range between 400 nm and 700 nm). It is, in fact, sufficient for the visual identification of the overt security element, if the human observer can at least see through the substrate in a part of the visible spectral domain. Preferably, the transparent substrate is chosen from polyethylene-terephthalate, polycarbonate, polyvinyl chloride, polyacrylates, polyacrylonitriles, polystyrene, polypropylene, poly-naphthalene-terephthalate, and mixtures or copolymers thereof.

Said transparent substrate may be coloured, entirely or in part, provided that there is transparency in at least part of the visible spectrum, such as to allow a human observer to see through, e.g. the transparent substrate and the laminate, and to allow for the perception of the magnetically induced image from both sides, recto and verso of the laminated product.

"Transparent" in the context of the present invention means: "providing for optical transparency at least in part of the visible spectrum (400 nm-700 nm wavelength)".

The angle-dependent image on the transparent substrate is produced by applying, orienting and drying/curing a magnetically orientable coating on this latter, e.g. according to the co-pending application EP06113891.3 filed by the same applicant, whose contents are incorporated herein by reference.

Thus, the process for producing said magnetically induced image coating on a transparent substrate comprises the steps of a) applying a coating composition comprising magnetically orientable pigments to a transparent substrate surface, b) orienting the magnetic pigment particles in the applied coating composition of step a) by applying a magnetic field so as to create a specific visual effect which changes depending upon the viewing angle under which said image coating is observed, such as a 3-dimensional effect in the coating which appears in positive or negative relief if observed from the recto- or verso side, respectively, and c) curing/drying the oriented coating composition of step b) to fix the particles in the oriented position.

In detail, to produce said magnetically induced image coating, a printing ink or coating composition, comprising magnetic orientable pigments, preferably magnetic optically variable interference pigments, is applied to said transparent substrate by a printing process such as copper plate intaglio printing, flexographic printing, gravure printing, silkscreen printing or roller coating, and the magnetic pigments are oriented, e.g. according to WO 2005/002866; the coating is finally dried/cured as known to the skilled man.

Suitable printing inks or coating compositions are disclosed in the co-pending European patent application EP06113891.3, wherein magnetic optically variable printing inks or coating compositions are described to the very detail, which have the required characteristics for the magnetic orientation of pigment particles to form patterns, images or designs in said coating.

The pigments comprised in the magnetic optically variable printing inks or coating compositions are preferably magnetic optically variable interference pigments chosen from vacuum deposited magnetic thin film interference pigments, interference coated metallic pigments, interference coated non-metallic pigments, magnetic liquid crystal pigments, and mixtures thereof. Magnetic optically variable pigments according to WO 02/073520; U.S. Pat. No. 4,838,648; EP-A 688675; WO 02/73250; WO 03/00801 or U.S. Pat. No. 6,838, 166 are preferably used according to the present invention. The vacuum deposited magnetic thin film interference pigments can be chosen form the five layer and seven layer vacuum deposited magnetic thin film interference pigments of U.S. Pat. No. 4,838,648 and WO 02/73250.

The magnetic pigment in the said coating is oriented by the application of suitable magnetic fields, preferably so as to show a 3-dimensional effect. The orienting step b) can be performed either simultaneously with the coating step a) or subsequently to the coating step a). Magnetic orientation of magnetic particles has been described in the art. Reference is made in this respect to the prior art documents cited in the introductory part of the present application.

The curing/drying step c) can be performed by physical evaporation of volatile compounds, UV curing, oxidative reticulation, chemical cross-linking, electron beam curing, or by any combination thereof.

The process for producing said security element may further comprise the step of laminating a transparent foil over the magnetically induced image coating, in order to increase the resistance and life-time of the security element. Said transparent foil can be chosen from poly-ethylene-terephthalate, polycarbonate, polyvinyl chloride, polyacrylates, polyacrylonitriles, polystyrene, polypropylene, poly-naphthalene-terephthalate, and mixtures or copolymers thereof. Thus, for the selection of the transparent over-lamination foil, the same criteria apply as for the transparent substrate. In a particular embodiment, the magnetically induced image coating is disposed between two plastic foils of the same type.

The security element of the present invention may further comprise other marking means such as infrared markers, luminescent markers such as fluorescent markers or phosphorescent markers, UV markers, magnetic markers, forensic markers or mixtures thereof, as well as other security elements (holograms, etc.), physically embossed reliefs or indicia.

A particularity of the security element of the present invention is that the color, the apparent relief, as well as the color-shifting properties are neutralized when it is illuminated from the back side, e.g. on a light table, or held against an illuminating background such as a lamp or the sky.

This additional effect further enhances the value of the security element of the present invention, because it allows for its rapid authentication by front-light against back-light observation. The perception of the angle-dependent, recto-verso 3-D relief features of the security element of the present invention depends in fact on front-lighting conditions.

Further to this, the perception of the security element of the present invention in translucidity depends also on the local coloration of the transparent substrate and of the over-lamination foil. This enables the skilled man to realize further interesting embodiments.

The security element of the present invention can be used on security documents or security articles such as banknotes, credit cards, access cards, security badges, documents of value, rights, or identity, transportation tickets, lottery tickets, event tickets, tax banderoles, security threads, labels, foils, tear-strips or product security applications, as a protection against counterfeit or illegal reproduction.

In general, the said security documents or security articles need to have a transparent area wherein the security element of the present invention is applied. This can be achieved by integration of transparent areas such as windows, threads and the like into said documents, e.g. a punched-out hole covered with a transparent foil, or, alternatively, said documents are completely made of such transparent substrates, providing for a transparent region, i.e. a region which is free of ink or coating. Some currencies, made of polymer substrate, provide for such transparent areas and are therefore able to carry the security element of the present invention.

The present invention will now be further illustrated with reference to non-limiting examples and drawings.

Figure 3:
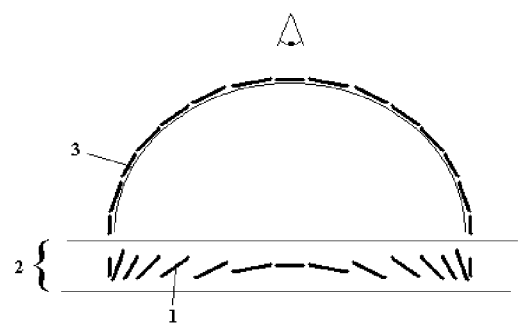
Figure 3:
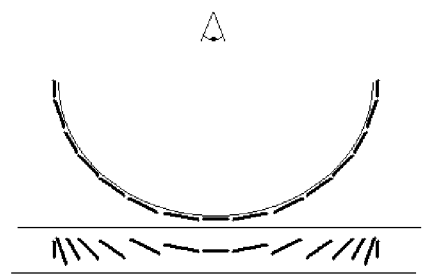

FIG. 3 schematically shows in a cross section view how a relief or 3D appearance is produced in a geometrically flat coating through the appropriate orientation of particles.

Figure 1:
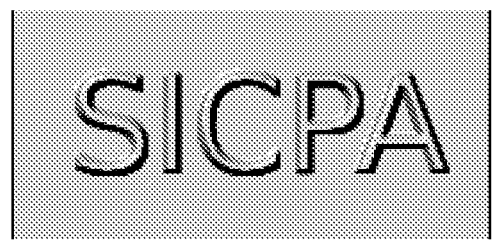
FIG. 1 shows a computer generated illustration of the inversion of a text in relief in recto and verso view, respectively.
Figure 1:
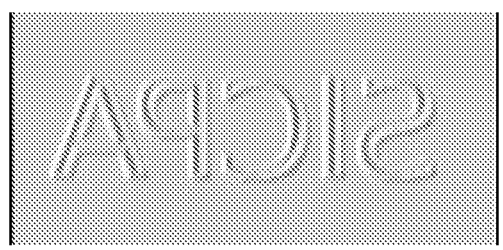

As illustrated in FIG. 1, the angle-dependent image (design, pattern) of the invention should allow for an easy perception of a relief, either coming out of the plane or going into the plane of the image, when viewed from one side or the other side.

Figure 2:
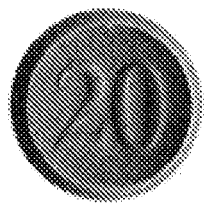
FIG. 2 shows the result of a copier scan of a magnetically induced image, comprising magnetic optically variable interference pigment according to the present invention. Both, the recto and the verso sides were scanned and reproduced.
Figure 2:
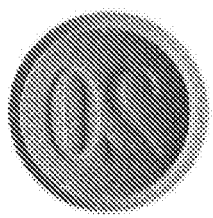

In FIG. 2, no particular difference is seen as to the 3D effect of the recto and the verso side. However, on the original, the "20" on the recto side (a) appears in positive relief on a concave surface, whereas the "20" on the verso side (b) appears in negative relief on a convex surface. This illustrates that the security element of the present invention is not copyable or scan-able.

FIG. 3 schematically shows in a cross section view how a relief or 3D appearance can be produced in a geometrically flat coating through the appropriate orientation of particles. The pigment flakes (1) in the coating (2) are oriented in the same way as if they would be present on the surface of a hemisphere (3) but projected down into the plane of the coating. In recto view a) the flakes fixed in their positions provide for the very same appearance as if they would be present on a convex hemisphere. In verso view b) the pigment flakes appear as if they would be present on a concave hemisphere.

This relief in FIG. 3 must not be confused with a physically embossed 3D-relief structure, which is a different security element. In fact, the security element of the present invention can be independently combined with such an embossed relief.

The invention claimed is:

1. Security element comprising
   a transparent substrate, and
   fixed pigment flakes on the transparent substrate magnetically oriented to form an angle-dependent image visible from both the recto and the verso side of the transparent substrate,
   wherein the angle-dependent image appears in positive or negative relief, respectively, if observed from the recto or verso side of the transparent substrate.

2. Security element according to claim 1, wherein said transparent substrate is selected from the group consisting of poly-ethylene-terephthalate, polycarbonate, polyvinyl chloride, polyacrylates, polyacrylonitrile, polystyrene, polypropylene, poly-naphthalene-terephthalate, and mixtures or copolymers thereof.

3. Security element according to claim 1, wherein a transparent foil is laminated over said image.

4. Security element according to claim 3, wherein said transparent foil is selected from the group consisting of poly-ethylene-terephthalate, polycarbonate, polyvinyl chloride, polyacrylates, polyacrylonitrile, polystyrene, polypropylene, poly-naphthalene-terephthalate, and mixtures or copolymers thereof.

5. Security element according to claim 1, wherein said pigment flakes are magnetic optically variable interference pigments.

6. Security element according to claim 5, wherein said magnetic optically variable interference pigments are selected from the group consisting of vacuum deposited magnetic thin film interference pigments, interference coated metallic pigments, interference coated non-metallic pigments, magnetic liquid crystal pigments, and mixtures thereof.

7. Security element according to claim 6, wherein said vacuum deposited magnetic thin film interference pigments are selected from the group consisting of five-layer and seven-layer vacuum deposited magnetic thin film interference pigments.

8. Security element according to claim 1, further comprising markers selected from the group consisting of infrared markers, fluorescent markers, UV markers, phosphorescence markers, magnetic markers, forensic markers and mixtures thereof.

9. Security element according to claim 1, further comprising other security elements selected from the group consisting of holograms, embossed reliefs, indicia or combinations thereof.

10. Security element according to claim 1, further comprising color-shifting elements, such as a switching optical effect or a rolling bar-type image.

11. Method of use of a security element according to claim 1 for a security document, said method comprising applying said security element onto said security document.

12. A document comprising at least one security element according to claim 1.

13. The method according to claim 11, wherein said security document is a banknote, credit card, access card, security badge, document of value, rights or identity, transportation ticket, lottery ticket, event ticket, tax banderole, security thread, label, foil, tear-strip or product security application.

14. The document according to claim 12, wherein said document is a banknote, a credit card, an access card, a security badge, a document of value, rights or identity, a transportation ticket, a lottery ticket, an event ticket, a tax banderole, a security thread, a label, a foil, a tear-strip or a product security application.

15. Security element according to claim 1, wherein the apparent relief on the recto side is neutralized by illumination from the verso side.

16. Process for producing a security element comprising
   a) applying a coating composition comprising magnetically orientable pigment flakes to a transparent substrate surface;
   b) orienting the magnetic pigment flakes in the applied coating composition with a magnetic field to form the an angle-dependent image which is visible from both the recto and verso side of the transparent substrate and appears in positive or negative relief, respectively, if observed from the recto or verso side of the transparent substrate; and
   c) curing or drying the oriented coating composition to fix the pigment flakes in the oriented position.

17. Process according to claim 16, further comprising laminating a transparent foil over said image.

18. Process according to claim 16, wherein said applying a) and orienting b) are performed simultaneously.

19. Process according to claim 16, wherein said orienting b) is performed subsequently to said applying a).

20. Process according to claim 16, wherein said curing or drying c) is carried out by a process selected from the group consisting of physical evaporation, UV-curing, oxidative reticulation, chemical crosslinking, electron beam curing, or any combination thereof.

21. Process according to claim 16, wherein said applying a) is performed by a printing process selected from the group consisting of copperplate intaglio printing, flexographic printing, gravure printing, silkscreen printing and roller coating.

22. Security element comprising
   a transparent substrate, and
   a coating on the transparent substrate comprising fixed oriented pigment flakes which have been magnetically oriented to at least in part thereby form an angle-dependent image having a 3-dimensional appearance visible from both the recto and the verso side of the transparent substrate.

23. Security element according to claim 22, wherein the 3-dimensional appearance visible on the recto side is neutralized by illumination from the verso side.

* * * * *